(12) United States Patent
Qwarfort et al.

(10) Patent No.: US 7,408,629 B2
(45) Date of Patent: Aug. 5, 2008

(54) PASSIVE MEASUREMENT OF TERRAIN PARAMETERS

(75) Inventors: Fredrik Qwarfort, Linköping (SE); Leif Askmalm, Linköping (SE)

(73) Assignee: SAAB AB, Linköping (SE)

( * ) Notice: Subject to any disclaimer, the term of this patent is extended or adjusted under 35 U.S.C. 154(b) by 683 days.

(21) Appl. No.: 11/098,427

(22) Filed: Apr. 5, 2005

(65) Prior Publication Data
US 2005/0273259 A1 Dec. 8, 2005

(30) Foreign Application Priority Data
Jun. 4, 2004 (EP) .................................. 04076078

(51) Int. Cl.
*G01P 3/36* (2006.01)
*G06K 9/00* (2006.01)
(52) U.S. Cl. ......................................... 356/28; 382/107
(58) Field of Classification Search .................. 356/28, 356/141.5; 382/106, 107, 294, 296; 701/10, 701/14, 225, 301; 342/29, 123
See application file for complete search history.

(56) References Cited

U.S. PATENT DOCUMENTS

| | | | |
|---|---|---|---|
| 5,367,333 A | | 11/1994 | Harriman |
| 5,373,318 A | * | 12/1994 | Harriman ..................... 348/117 |
| 5,606,627 A | * | 2/1997 | Kuo ............................. 382/154 |
| 5,963,664 A | * | 10/1999 | Kumar et al. ................ 382/154 |
| 6,307,959 B1 | * | 10/2001 | Mandelbaum et al. ...... 382/154 |
| 2003/0118213 A1 | | 6/2003 | Parker |

OTHER PUBLICATIONS

Min S. Kang, et al., "Recovering an elevation map by stereo modeling of the aerial image sequence", Nov. 1994.

* cited by examiner

*Primary Examiner*—Isam Alsomiri
(74) *Attorney, Agent, or Firm*—Venable LLP; Michael A. Sartori

(57) ABSTRACT

A method and a system for determining a terrain parameter relative to a vehicle (100) by registering a first image from the vehicle located at a first point in space, then registering a second image from the vehicle (100) when it is located at a second point in space ($O_2$). Receiving vehicle movement data which describes at least one of a translation (R) between the first and second points in space ($O_1$; $O_2$), and a rotation (A) between the first and second points in space ($O_1$; $O_2$). A first image velocity vector is determined, which describes a movement of the primary representation of the first terrain point ($P_1$) in the first image to the secondary representation thereof in the second image. A second image velocity vector is determined, which describes a movement of the primary representation of the second terrain point ($P_2$) in the first image to the secondary representation thereof in the second image. A terrain vector is then resolved from a respective relationship expressing each of the first and second image velocity vectors as a function of the translation and the rotation, the terrain vector extending between one of the first and second points in space ($O_1$; $O_2$) and a particular terrain point (T) in proximity of the vehicle (100).

16 Claims, 3 Drawing Sheets

PASSIVE MEASUREMENT OF TERRAIN PARAMETERS

THE BACKGROUND OF THE INVENTION AND PRIOR ART

The present invention relates generally to passive determination of terrain parameters in relation to a vehicle. More particularly the invention relates to a method of determining a terrain parameter according to the preamble of claim 1 and an on-board arrangement according to the preamble of claim 10. The invention also relates to a computer program according to claim 7, a computer readable medium according to claim 8 and an air vehicle according to claim 16.

Today, there exist many alternative means of navigation aids for vehicles, such as aircrafts. For instance, in the last decades, global navigation satellite systems (GNSS:s) have been developed which render it possible to determine a vehicle's position on the basis of accurate radio signals received from a plurality of satellites (at least four). The most wide spread GNSS standards are represented by the U.S. GPS (Global Positioning System), the Russian correspondence GLONASS (Global Navigation Satellite System) and the European Galileo satellite system. In military applications, however, it is generally not advisable to rely on an external system such as a GNSS, since this type of system may be struck out or its signals may be spoofed and/or distorted.

Instead, a purely local solution is normally used, such as a radar altimeter or a sonar in combination with a terrain database. Nevertheless, passive systems, i.e. where no signals are emitted, are preferable because this strategy reduces the risk of detection. Additionally, a passive system is less sensitive to distortion and spoofing by others.

For instance, passive ranging may be accomplished by means of triangulation, wherein angular sensors are used to measure angles to a remote point in the terrain. Teodolites and cameras may here function as angular sensors. Basically two different strategies may be applied—stereo measurement by means of multiple sensors, or time separated measurements where a single sensor is placed at different locations, however aimed against the same point.

Stereo measurement is advantageous because it enables distance determination based on a single image, so that an essentially instantaneous result may be obtained. However, in order to attain a high accuracy, the distance between the angular sensors must be relatively large. Thus, the vehicle's dimensions must be comparatively large. Normally, at least in aircraft applications, this is not the case. Therefore, stereo measurement is an unsuitable technology for determining the distance between an aircraft and the ground.

However, by performing the measurements at different time instances a sufficiently large sensor separation may be achieved. Specifically, a first image is recorded at a first point in space, and a second image is recorded at a second point in space. Provided that the spatial distance is known between the first and second points and that a number of identifiable terrain points occur in both images, it is possible to calculate the distance to a remote point with high accuracy.

One important factor, which may severely influence the accuracy is that the angular sensor may be oriented differently when recording the second image than when recording the first image. Typically, such a change in orientation is due to that the vehicle has altered its attitude angle and/or rolled between the first and second points in space. Of course, this problem is particularly accentuated in aircraft applications. Consequently, in addition to the spatial distance (or translation) between the image registration points, the attitude change (or rotation) must be known.

The U.S. Pat. Nos. 5,373,318 and 5,367,333 describe passive range measurement systems, wherein optical flow data is used to determine distances to various objects in the terrain. Both systems, however, require input data in the form of a so-called drift angle which describes the total change of the attitude angle due to a rotation of the camera and/or the vehicle onto which the camera is mounted. Although today's inertial sensors (e.g. including gyros, microactuators, and/or microsensors) may provide very accurate translation data, it is still problematic to register the relevant rotation with sufficiently high accuracy. Consequently, the calculated range is not a reliable figure either.

SUMMARY OF THE INVENTION

The object of the present invention is therefore to provide a purely passive solution for determining a terrain parameter relative to a vehicle, which alleviates the above problems and thus offers an accurate and reliable estimate of said terrain parameter, even though any rotation between the image registration points may be unknown.

According to one aspect of the invention, the object is achieved by the method of determining a terrain parameter relative to a vehicle as initially described, wherein vehicle movement data is received, which describes a translation between the first and second points in space and/or a rotation between these points. Moreover, the calculating step involves: determining a first image velocity vector, which describes a movement of the primary representation of the first terrain point in the first image to the secondary representation thereof in the second image; determining a second image velocity vector, which describes a movement of the primary representation of the second terrain point in the first image to the secondary representation thereof in the second image; and resolving a terrain vector from a respective relationship expressing each of the first and second image velocity vectors as a function of the translation and the rotation. The terrain vector extends between either the first point in space and a particular terrain point in proximity of the vehicle, or between the second point in space and such a terrain point.

This method is advantageous because thereby terrain parameters may be determined very accurately based on a minimum of input data. For example, if only the translation is known between the image registration points, a corresponding rotation (or attitude change) can be unknown, and still a reliable result is obtainable. Furthermore, if more data is input, for instance by registering more than two terrain points, and/or vehicle movement data is received in the form of both translation and rotation vectors, even more accurate output data may be produced.

According to a preferred embodiment of this aspect of the invention, the method includes deriving a vertical altitude based on the terrain vector. The vertical altitude may be expressed in terms of a point in the terrain, either at first or the second point in space. Naturally, this type of parameter is desirable in many applications, such as when flying an air vehicle or maneuvering a maritime vehicle. Moreover, by taking advantage of a terrain database, repeated determinations of the altitude may be used to navigate the vehicle.

According to another preferred embodiment of this aspect of the invention, the method includes: receiving a respective position of the first and second terrain points; and deriving, based on the terrain vector, a vehicle position, either at the first or the second point in space. Thus, the vehicle's own position may be derived also without a complete terrain database, provided that the position is known for at least two visible terrain points.

According to yet another preferred embodiment of this aspect of the invention, the method includes receiving vehicle movement data in the form of a translation vector, which represents a movement in space between the first and second points in space. Thereby, for instance, an airplane may accurately determine its distance to various points in the terrain without registering its own attitude. This provides a simple and robust ranging solution.

According to still another preferred embodiment of this aspect of the invention, the method instead includes receiving vehicle movement data in the form of a rotation vector, which represents an attitude change between the first and second points in space. Thus, terrain parameters relative to the vehicle may be derived without requiring a recording of the vehicle's translation between image registration points.

According to yet another preferred embodiment of this aspect of the invention, the method includes: receiving a respective vehicle position for each of the first and second points in space; and deriving a position of a terrain point in proximity of the vehicle based on the terrain vector. Consequently, if the vehicle's own position is known, for instance by means of a terrain filter, the geographical position of any visible terrain point may also be determined. Naturally, this is a highly desirable feature in most vehicle applications, and particularly in military crafts when combating targets, performing intelligence operations or during landing of an air vehicle.

According to a further aspect of the invention, the object is achieved by a computer program, which is directly loadable into the internal memory of a computer, and includes software for controlling the above proposed method when said program is run on a computer.

According to another aspect of the invention, the object is achieved by a computer readable medium, having a program recorded thereon, where the program is to control a computer to perform the above proposed method.

According to yet another aspect of the invention, the object is achieved by the initially described on-board arrangement for determining a terrain parameter relative to a vehicle, wherein the processing means is adapted to receive vehicle movement data. This data describes a translation between the first and second points in space and/or a rotation between the first and second points in space. Furthermore, the processing means is adapted to: determine a first image velocity vector, which describes a movement of the primary representation of the first terrain point in the first image to the secondary representation thereof in the second image; and determine a second image velocity vector, which describes a movement of the primary representation of the second terrain point in the first image to the secondary representation thereof in the second image. Additionally, the processing means is adapted to resolve a terrain vector from a respective relationship expressing each of the first and second image velocity vectors as a function of the translation and the rotation. Here, we presume that the terrain vector extends between either the first point in space and a particular terrain point in proximity of the vehicle, or between the second point in space and such a terrain point.

An important advantage attained by this arrangement is that the arrangement renders it possible to accurately determine terrain parameters relative to a vehicle based on a minimum of input data.

According to a preferred embodiment of this aspect of the invention, the processing means is adapted to derive a vertical altitude over the terrain based on the terrain vector. The altitude is expressed either at the first point in space, or at the second point in space. This altitude parameter is desirable, for example when flying an air vehicle or maneuvering a maritime vehicle. Moreover, by means of a terrain database and repeated determinations of the altitude, it is possible to navigate the vehicle.

According to another preferred embodiment of this aspect of the invention, the processing means is adapted to receive a respective position of the first and second terrain points; and derive a vehicle position based on the terrain vector. The positioning is made either at first or the second point in space. Hence, the processing means may derive a vehicle position also without a complete terrain database. It is sufficient that the position is known for at least two visible terrain points According to yet another preferred embodiment of this aspect of the invention, the processing means is adapted to receive a respective vehicle position for each of the first and second points in space, and based on the terrain vector, derive a position of a terrain point in proximity of the vehicle. Hence, by entering data (say, from a terrain filter) in respect of the vehicle's position when producing the images, the processing means may determine the position of any visible terrain point. This is a highly desirable feature in numerous military applications, such as when combating targets and performing intelligence operations.

The simple and robust ranging and positioning provided by the invention offers an excellent basis for controlling a wide range of vehicles. One example is unmanned aerial vehicles (UAV:s), which may operate very efficiently based on the proposed solution.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
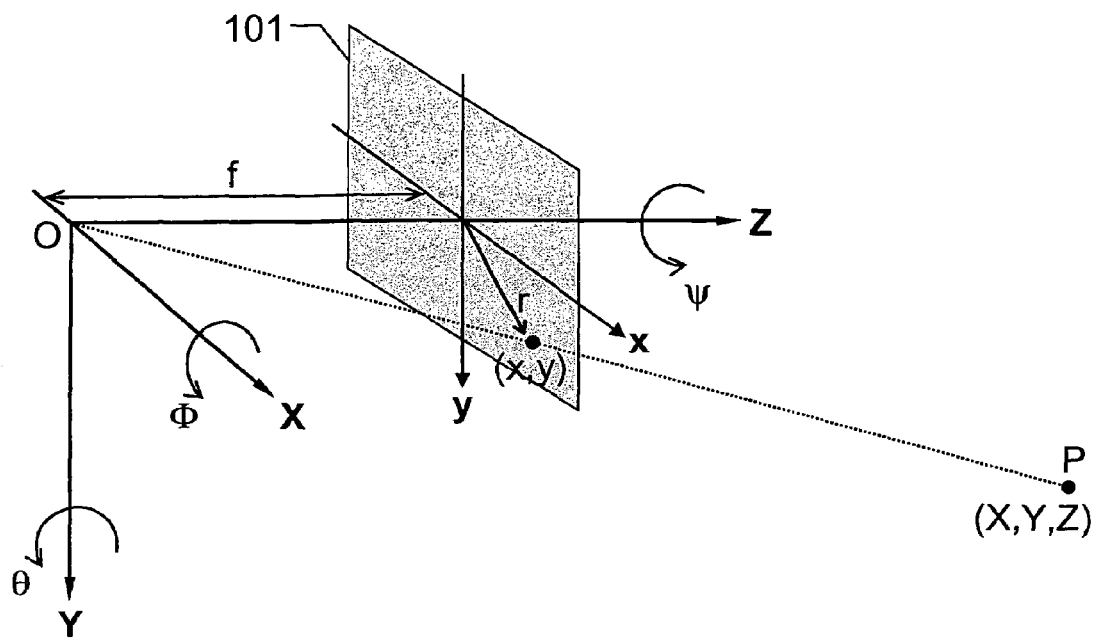
FIG. 1 illustrates a camera model according to which a representation of a particular terrain point is centrally projected onto an image plane.

A camera may be described geometrically by means of a so-called central projection model. FIG. 1 illustrates such a model of a camera having a focal length f. This means that all light rays that enter the camera cross one another at a focal point O, which lies at a distance f behind an image plane 101 along a central optical axis Z. The image plane 101, in turn, is spanned by coordinate axes X and Y, which are both perpendicular to the optical axis Z. Thus, the focal point O represents a projection center, and the camera direction is given by the optical axis Z.

Specifically, when registering an image that includes a terrain point P, light from the point P is projected onto the image plane 101, so that the point P is represented at image coordinates (x,y) in the image plane 101. Hence, the camera may be regarded as an angular sensor, since the image coordinates (x,y) and the focal length f can be expressed in polar coordinates (r,θ,Φ), where r denotes an unknown distance to the center of the image plane 101 (i.e. at the optical axis Z). Therefore, r is normally set to unit length (r=1). This gives us the polar equivalence (1,θ,Φ) to the image coordinates (x,y), where θ represents a rotation around the Y-axis and Φ represents a rotation around the X-axis.

Provided that the terrain point P has the geographical coordinates (X,Y,Z), the image coordinates (x,y) may be expressed by a camera equation:

$$\begin{pmatrix} x \\ y \end{pmatrix} = \frac{f}{Z}\begin{pmatrix} X \\ Y \end{pmatrix}$$

Furthermore, if we presume that the focal length f is constant, an "image velocity", i.e. a movement per time unit of a certain image element, or pixel, in terms of image coordinates (x,y) due to an altered camera position, is represented by the time derivatives of this expression. Thus, $$\dot{x}=f/Z\dot{X}-x/Z\dot{Z}$$

$$\dot{y}=f/Z\dot{Y}-y/Z\dot{Z}$$

where $$\dot{X} = \frac{dX(t)}{dt} \text{ and } \dot{Y} = \frac{dY(t)}{dt}$$

describes the "image velocity" in the X- and Y directions respectively.

Now, we separate $\dot{X}$ into a translation $R_x$ and a rotation $R_{rx}$, and define an attitude vector $\overline{A}=(\phi,\theta,\Psi)^T$ plus a radius vector $\overline{r}=(X,Y,Z)^T$ to the terrain point P. This gives us:

$$\dot{X}=R_x+R_{rx}=R_x+(\overline{A}\times\overline{r})\cdot\hat{X}$$

where $\hat{X}$ is an estimate of the geographical X-coordinate of the terrain point P.

Correspondingly:

$$\dot{Y}=R_y+R_{ry}=R_y+(\overline{A}\times\overline{r})\cdot\hat{Y}$$

where $\hat{Y}$ is an estimate of the geographical Y-coordinate of the terrain point P.

This gives us:

$$\dot{X} = R_x + \left(Z\theta - \frac{Z_y}{f}\psi\right),$$

and $$\dot{Y}=R_y+(X\psi-Z\Phi)$$

Let us then define a velocity vector $\overline{v}=(\dot{x},\dot{y})^T$ to describe the "image velocity" of the image coordinates (x,y). This results in a velocity expression:

$$\overline{v}(x,y) = \frac{1}{Z}\begin{pmatrix} f & 0 & -x \\ 0 & f & -y \end{pmatrix}\overline{R} + \begin{pmatrix} -\frac{xy}{f} & \left(f+\frac{x^2}{f}\right) & -y \\ -\left(f+\frac{y^2}{f}\right) & \frac{xy}{f} & x \end{pmatrix}\overline{A}$$

where $\overline{R}$ is a vector that describes a translation of the camera between a first image and a second image in which the terrain point P is represented by the image coordinates (x,y), and $\overline{A}$ is a vector that describes a corresponding rotation of the camera between the first and second images.

Figure 2:
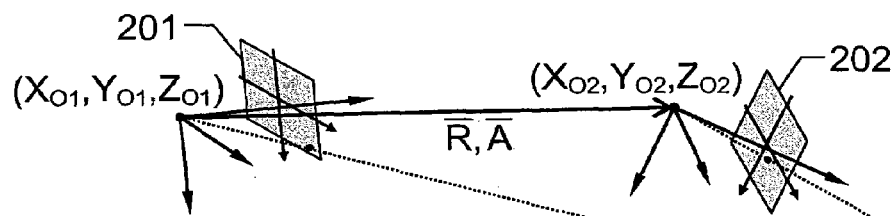
FIG. 2 illustrates how one and the same terrain point is recorded in two different images taken from different points in space.
Figure 3:
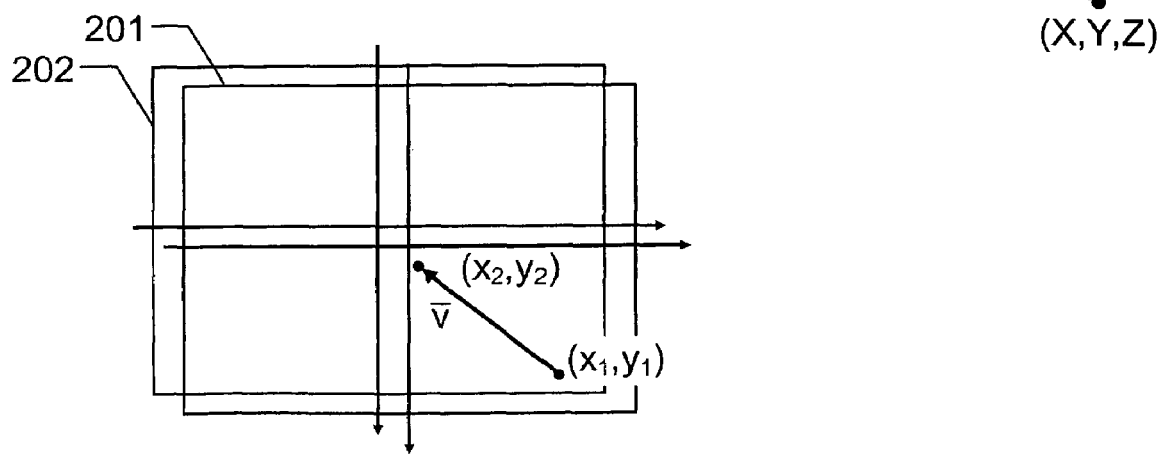
FIG. 3 shows the two images of FIG. 2 and an image velocity vector describing how the representation of the particular terrain point moves between the first and second images.

To further illustrate this, the FIGS. 2 and 3 show how a terrain point P is recorded in two different images 201 and 202, which are taken from different points in space that have the geographical coordinates $(X_{O1},Y_{O1},Z_{O1})$ and $(X_{O2},Y_{O2},Z_{O2})$ respectively. Again, we assume that the terrain point P has the coordinates (X,Y,Z). A primary representation of this point occurs at a first set of coordinates $(x_1,y_1)$ in a first image 201, and a secondary representation of the point P occurs at a second set of coordinates $(x_2,y_2)$ in a second image 202. We further assume that the movement from $(x_1,y_1)$ to $(x_2,y_2)$ may be described by a linear velocity given by an image velocity vector $\overline{v}$.

Moreover, the movement of the representation of the terrain point P from $(x_1,y_1)$ to $(x_2,y_2)$ is presumed to be due the result of that the camera has moved from $(X_{O1},Y_{O1},Z_{O1})$ and $(X_{O2},Y_{O2},Z_{O2})$. Thus, the terrain point P is essentially stationary at (X,Y,Z). The camera movement from the first point in space $(X_{O1},Y_{O1},Z_{O1})$ to the second point in space $(X_{O2},Y_{O2},Z_{O2})$ is given by a translation vector $\overline{R}$ and a rotation vector $\overline{A}$.

Figure 4:
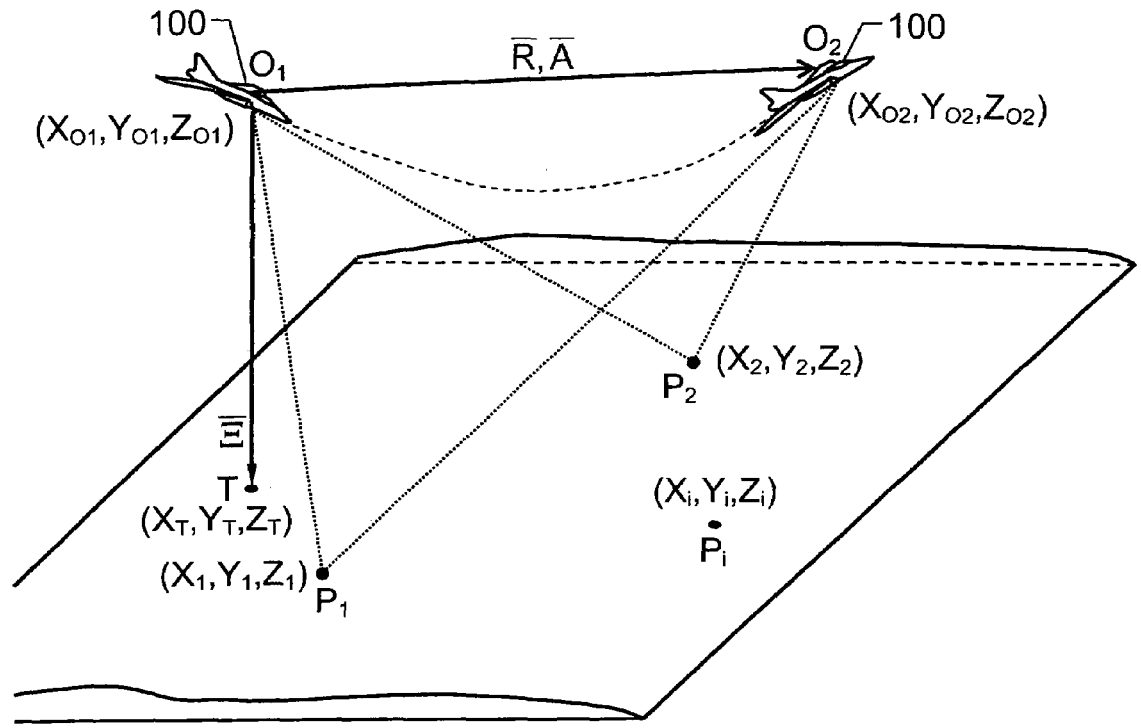
FIG. 4 shows a perspective view of a scene in which an air vehicle registers images of two terrain points from two different points in space.
Figure 5:
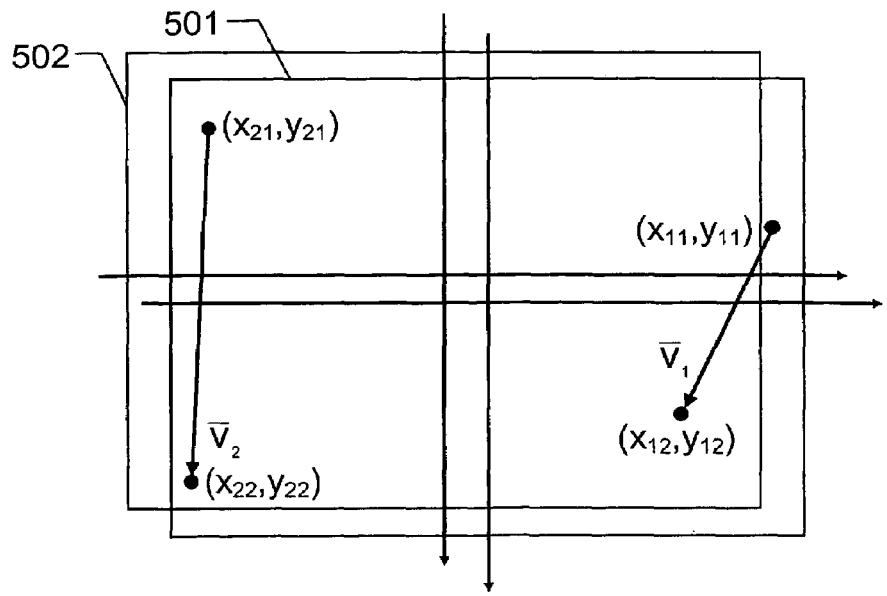
FIG. 5 shows the two images of FIG. 4 including image velocity vectors for the representations of the two terrain points.

The FIGS. 4 and 5 exemplify how the above relationships can be used to determine a terrain parameter relative to a vehicle 100. FIG. 4 shows a perspective view of a scene in which a vehicle 100 in the form of an aircraft registers a first image of two terrain points $P_1$ and $P_2$ from a first point in space $O_1$, and a second image of the points $P_1$ and $P_2$ registered from a second point in space $O_2$.

FIG. 5 shows the first image 501 and the second 502 image of FIG. 4, which include image velocity vectors $\overline{v}_1$ and $\overline{v}_2$. A first image velocity vector $\overline{v}_1$ describes a movement of a primary representation $(x_{11},y_{11})$ of the first terrain point $P_1$ in the first image 501 to a secondary representation $(x_{12},y_{12})$ of the first terrain point $P_1$ in the second image 502. Correspondingly, a second image velocity vector $\overline{v}_2$ describes a movement of a primary representation $(x_{21},y_{21})$ of the second terrain point $P_2$ in the first image 501 to a secondary representation $(x_{22},y_{22})$ of the second terrain point $P_2$ in the second image 502.

According to the invention, vehicle movement data is also received which either describes a translation $\overline{R}$ of the camera between the first and second points in space $O_1$ and $O_2$, or describes a rotation $\overline{A}$ of the camera between these points $O_1$ and $O_2$. It is preferable if the camera is fixed, and has an undeviating orientation in relation to the vehicle 100, such that the translation $\overline{R}$ and the rotation $\overline{A}$ also represent the translation and rotation of the vehicle 100 per se. As mentioned previously, the translation data $\overline{R}$ produced by the presently available inertial sensors is normally more reliable than the rotation data $\overline{A}$. Hence, it is generally more desirable to receive the translation $\overline{R}$ than to receive the rotation $\overline{A}$. However, according to the invention any of these sets of data is sufficient to determine the terrain parameter relative to the vehicle 100. Of course, if movement data is available, which describes both the translation $\overline{R}$ and the rotation $\overline{A}$ this is even more desirable. The equation system then becomes over-determined, and is preferably solved by means of a least-square method.

In any case, according to the invention, the first image velocity vector $\overline{v}_1$ is determined based on the representations $(x_{11},y_{11})$ and $(x_{12},y_{12})$ of the first terrain point $P_1$ in the first and second images 501 and 502. Equally, the second image velocity vector $\overline{v}_2$ is determined based on the representations $(x_{21},y_{21})$ and $(x_{22},y_{22})$ of the second terrain point $P_2$ in the first and second images 501 and 502.

Now, since the two terrain points $P_1$ and $P_2$ are recorded in both the images 501 and 502, and since the same translation $\overline{R}$ and rotation $\overline{A}$ are valid to both the image velocity vectors $\overline{v}_1$ and $\overline{v}_2$, we have enough known variables to resolve a terrain vector $\Xi$, which extends between the first point in space $O_1$ and a particular terrain point $T$ in proximity of the vehicle 100 from the velocity expressions for the image velocity vectors $\overline{v}_1$ and $\overline{v}_2$ in combination with the camera equation (see above).

If data in respect of more than two terrain points is received, the equation system becomes over-determined, and is preferably solved by means of a least-square method.

The terrain point T, which is presumed to have the geographical coordinates $(X_T,Y_T,Z_T)$ may be chosen arbitrarily. However, it is often interesting to select a terrain point T located vertically below the first point in space $O_1$, such that an altitude $Z_{O1}$ of the vehicle 100 above the ground may be determined based on the terrain vector $\Xi$. Furthermore, the terrain vector $\Xi$ may equally well be resolved to extend between the second point in space $O_2$ and the terrain point T.

Depending on whether the coordinates $(X_1,Y_1,Z_1)$ and $(X_2,Y_2,Z_2)$ for the first and second terrain points $P_1$ and $P_2$ respectively are known, or if the vehicle positions $(X_{O1},Y_{O1},Z_{O1})$ and $(X_{O2},Y_{O2},Z_{O2})$ for each of the first and second points in space $O_1$ and $O_2$ respectively are known, different result data may be obtained based on the terrain vector $\Xi$. For instance, if the respective positions $(X_1,Y_1,Z_1)$ and $(X_2,Y_2,Z_2)$ of the first and second terrain points $P_1$ and $P_2$ are received in connection with the images 501 and 502, a vehicle position may be derived from the terrain vector $\Xi$. The position of the vehicle 100, in turn, may be expressed either at the first point in space $O_1$ (i.e. $(X_{O1},Y_{O1},Z_{O1})$) or at the second point in space $O_2$ (i.e. $(X_{O2},Y_{O2},Z_{O2})$).

If instead a respective position $(X_{O1},Y_{O1},Z_{O1})$ and $(X_{O2},Y_{O2},Z_{O2})$ is known for the vehicle 100 at each of the first and second points in space $O_1$ and $O_2$ (i.e. from which the images 501 and 502 are recorded), a position $(X_i,Y_i,Z_i)$ of a terrain point $P_i$ in proximity of the vehicle 100 may be derived from the terrain vector $\Xi$. The vehicle positions $(X_{O1},Y_{O1},Z_{O1})$ and $(X_{O2},Y_{O2},Z_{O2})$ may be determined by means of a terrain filter, e.g. including inertial sensors and a terrain database, and the terrain point $P_i$ may represent a military target, a landing strip or any other object that is interesting to locate geographically.

Figure 6:
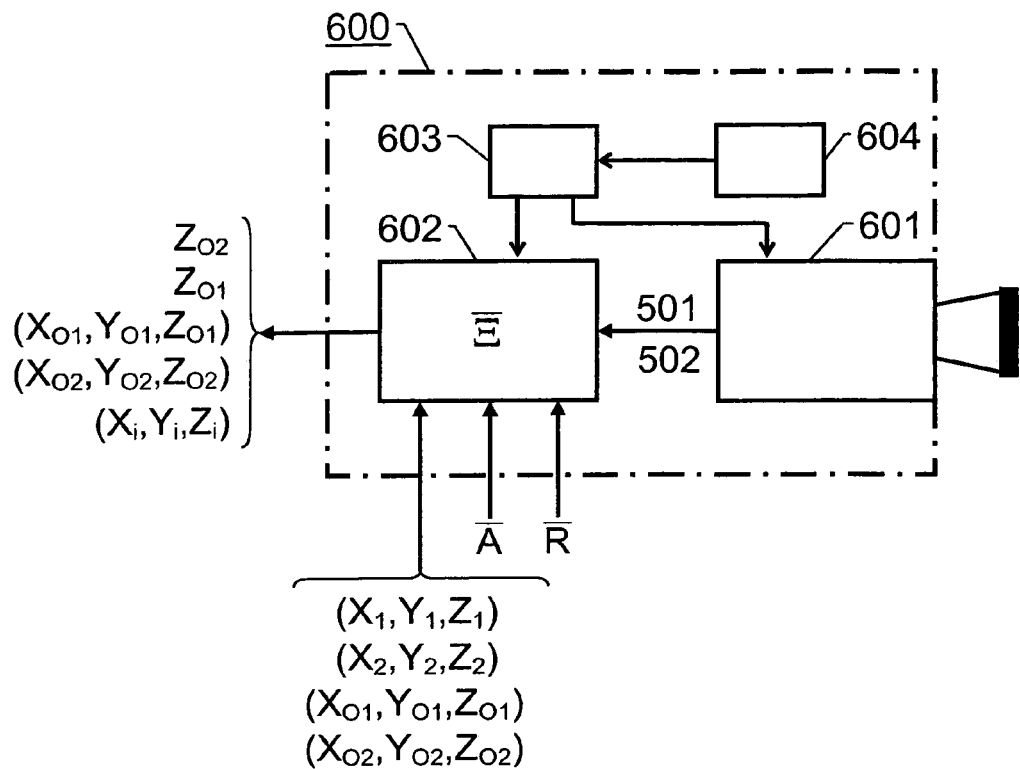
FIG. 6 shows a block diagram of an on-board arrangement according to a preferred embodiment of the invention.

FIG. 6 shows a block diagram of an on-board arrangement 600 according to a preferred embodiment of the invention. The arrangement 600, is intended to be mounted in a vehicle, so that it can determine a terrain parameter relative to this vehicle. The arrangement 600 includes a camera means 601, a processing means 602, a control unit 603 and a computer readable medium 604.

The camera means 601, e.g. represented by a video camera or an infra red (IR) camera, is adapted to register first and second images 501 and 502, which include primary and secondary representations of at least two terrain points according to what has been described above.

The processing means 602 is adapted to receive the images 501 and 502 from the camera means 601. The processing means 602 is also adapted to receive vehicle movement data, which describes a translation $\overline{R}$ and/or a rotation $\overline{A}$ between the points in space from which the images 501 and 502 have been recorded. Moreover, as described above, the processing means 602 is adapted to receive at least two geographical coordinates, either representing the image registration points $(X_{O1},Y_{O1},Z_{O1})$ and $(X_{O2},Y_{O2},Z_{O2})$, or representing the at least two terrain points $(X_1,Y_1,Z_1)$ and $(X_2,Y_2,Z_2)$ depending on which output result that is desired. Based on the information in the images 501 and 502, the processing means 602 determines a first and a second image a velocity vector according to the above-described principles. Then, the processing means 602 resolves a terrain vector $\Xi$ from a respective relationship expressing each of the first and second image velocity vectors as a function of the translation $\overline{R}$ and the rotation. Finally, the processing means 602 derives output data from the terrain vector $\Xi$. Depending on the at least two geographical coordinates fed in, the processing means 602 produces relevant output data. If geographical coordinates in the form of image registration points $(X_{O1},Y_{O1},Z_{O1})$ and $(X_{O2},Y_{O2},Z_{O2})$ are entered, the processing means 602 delivers the coordinates for a desired terrain point $(X_i,Y_i,Z_i)$, and if instead terrain point coordinates $(X_1,Y_1,Z_1)$ and $(X_2,Y_2,Z_2)$ are fed in, a vehicle position $(X_{O1},Y_{O1},Z_{O1})$ or $(X_{O2},Y_{O2},Z_{O2})$ may be delivered.

If, however, no geographical coordinates are entered, the processing means 602 may still generate altitude data, which represents the vehicle's vertical distance to the terrain, either at the first image registration point (i.e. $Z_{O1}$), or at the second image registration point (i.e. $Z_{O2}$).

The control unit 603 is adapted to control the camera means 601 and the processing means 602 according to the proposed procedure. The computer readable medium 604 stores software, which in turn, includes the relevant code for the operation of the control unit 603.

According to one embodiment of the invention, the control unit 603 and the processing means 602 are co-located in one physical unit. Moreover, as an alternative to the software in the computer readable medium 604, the camera means 601 and the processing means 602 may be controlled by hard coded instructions.

Figure 7:
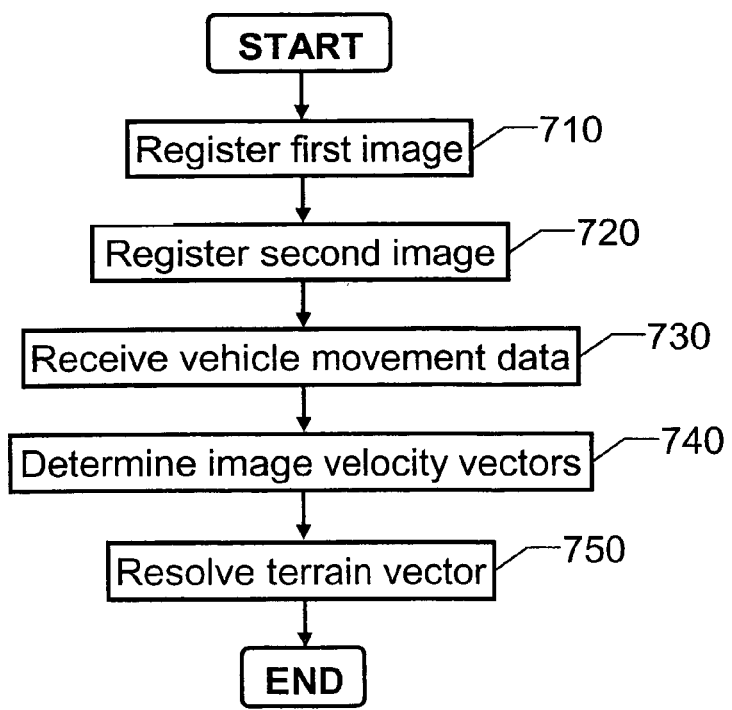
FIG. 7 shows a flow diagram which describes the general method according to the invention.

In order to sum up, the general method according to the invention will now be described with reference to FIG. 7.

A first step 710 registers a first image including a respective primary representation of a first and a second terrain point. It is presumed that the first image is recorded from a first point in space. Then, when located at a second point in space, a step 720 registers a second image including a respective secondary representation of the first and second terrain points. Subsequently, a step 730 receives vehicle movement data, which describes a translation $\overline{R}$ and/or a rotation $\overline{A}$ between the points in space from which the first and second images have been recorded. After that, a step 740 determines a first image velocity vector, which describes a movement of the primary representation of the first terrain point in the first image to the secondary representation thereof in the second image. The step 740 also determines a second image velocity vector, which describes a movement of the primary representation of the second terrain point in the first image to the secondary representation thereof in the second image. Finally, a step 750 resolves a terrain vector $\Xi$ from a respective relationship that expresses each of the first and second image velocity vectors as a function of the translation $\overline{R}$ and the rotation plus a camera model, which describes the geometric relationship between a particular terrain point and its projected representation onto the image plane of the camera means used to register the first and second images. The terrain vector $\Xi$ extends between the first image registration point and a particular terrain point in proximity of the vehicle, or between the second image registration point and such a terrain point.

All of the process steps, as well as any sub-sequence of steps, described with reference to the FIG. 7 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method of determining a terrain parameter relative to a vehicle comprising:
    registering from the vehicle, when located at a first point in space ($O_1$), a first image including a primary representation ($x_{11}, y_{11}$) of a first terrain point ($P_1$) and a primary representation ($x_{21}, y_{21}$) of a second terrain point ($P_2$);
    registering from the vehicle, when located at a second point in space ($O_2$), a second image including a secondary representation ($x_{12}, y_{12}$) of the first terrain point ($P_1$) and a secondary representation ($x_{22}, y_{22}$) of the second terrain point ($P_2$);
    calculating the terrain parameter at least based on the first and second images combined with a camera model describing a geometric relationship between a particular terrain point (P) and its projected representation (x,y) onto an image plane;
    said calculating comprising:
        determining a first image velocity vector ($\overline{v}_1$) which describes a movement of the primary representation ($x_{11}, y_{11}$) of the first terrain point ($P_1$) in the first image to the secondary representation ($x_{12}, y_{12}$) thereof in the second image; and
        determining a second image velocity vector ($\overline{v}_2$) which describes a movement of the primary representation ($x_{21}, y_{21}$) of the second terrain point ($P_2$) in the first image to the secondary representation ($x_{22}, y_{22}$) thereof in the second image;
    receiving vehicle movement data describing at least one of a translation between the first and second points in space ($O_1$; $O_2$) and a rotation between the first and second points in space ($O_1$; $O_2$); and
    resolving a terrain vector ($\Xi$) from a respective relationship expressing each of the first and second image velocity vectors ($\overline{v}_2$, $\overline{v}_1$) as a function of at least one of the translation and the rotation, the terrain vector ($\Xi$) extending between one of the first and second points in space ($O_1$; $O_2$) and a particular terrain point (T) in proximity of the vehicle.

2. A method according to claim 1, further comprising:
deriving, based on the terrain vector ($\Xi$) a vertical altitude ($Z_{O1}$, $Z_{O2}$) of one of the first and second points in space ($O_1$; $O_2$) above a point in the terrain.

3. A method according to claim 1 further comprising:
receiving a respective position ($X_1, Y_1, Z_1$; $X_2, Y_2, Z_2$) of the first and second terrain points ($P_1$; $P_2$); and
deriving, based on the terrain vector ($\Xi$), a vehicle position ($X_{O1}, Y_{O1}, Z_{O1}$; $X_{O2}, Y_{O2}, Z_{O2}$) at one of the first and second points in space ($O_1$; $O_2$).

4. A method according to claim 3, further comprising:
receiving vehicle movement data in the form of a translation vector ($\overline{R}$) which represents a movement in space between the first and second points in space ($O_1$; $O_2$).

5. A method according to claim 3, further comprising:
receiving vehicle movement data in the form of a rotation vector ($\overline{A}$) which represents an attitude change between the first and second points in space ($O_1$; $O_2$).

6. A method according to claim 1, further comprising:
receiving a respective vehicle position ($X_{O1}, Y_{O1}, Z_{O1}$; $X_{O2}, Y_{O2}, Z_{O2}$) for each of the first and second points in space ($O_1$; $O_2$); and
deriving, based on the terrain vector ($\Xi$), a position ($X_i, Y_i, Z_i$) of a terrain point ($P_i$) in proximity of the vehicle.

7. A method according to claim 6, wherein the terrain point represents one of a military target and a landing strip.

8. A computer program embodied in a tangible medium and directly loadable into internal memory of a digital computer, and executable by the computer for performing the steps of claim 1.

9. A tangible computer readable medium encoded with a computer program executable in a computer to control the steps of claim 1.

10. An on-board arrangement for determining a terrain parameter relative to a vehicle which carries the arrangement, the arrangement comprising:
    a camera means adapted to:
        register a first image including a primary representation ($x_{11}, y_{11}$) of a first terrain point ($P_1$) and a primary representation ($x_{21}, y_{21}$) of a second terrain point ($P_2$) when the vehicle is located at a first point in space ($O_1$); and
        register a second image including a secondary representation ($x_{12}, y_{12}$) of the first terrain point ($P_1$) and a secondary representation $(x_{22}, y_{22})$ of the second terrain point $(P_2)$ when the vehicle is located at a second point in space $(O_2)$; and a processing means adapted to calculate the terrain parameter at least based on the first and second images combined with a camera model describing a geometric relationship between a particular terrain point (P) and its projected representation (x,y) onto an image plane of the camera means, wherein the processing means is further adapted to receive vehicle movement data describing at least one of:

a translation between the first and second points in space $(O_1; O_2)$; and a rotation between the first and second points in space $(O_1; O_2)$;

and wherein the processing means is adapted to:

determine a first image velocity vector $(\bar{v}_1)$ which describes a movement of the primary representation $(x_{11}, y_{11})$ of the first terrain point $(P_1)$ in the first image to the secondary representation $(x_{12}, y_{12})$ thereof in the second image;

determine a second image velocity vector $(\bar{v}_2)$ which describes a movement of the primary representation $(x_{21}, y_{21})$ of the second terrain point $(P_2)$ in the first image to the secondary representation $(x_{22}, y_{22})$ thereof in the second image; and resolve a terrain vector $(\bar{\Xi})$ from a respective relationship expressing each of the first and second image velocity vectors $(\bar{v}_2, \bar{v}_1)$ as a function of the translation and the rotation, the terrain vector $(\bar{\Xi})$ extending between one of the first and second points in space $(O_1; O_2)$ and a particular terrain point (T) in proximity of the vehicle.

11. An on-board arrangement according to claim 10, wherein the processing means is adapted to derive, based on the terrain vector $(\bar{\Xi})$, a vertical altitude $(Z_{O1}, Z_{O2})$ of one of the first and second points in space $(O_1; O_2)$ above a point in the terrain.

12. An on-board arrangement according to claim 10, wherein the processing means is adapted to receive a respective position $(X_1, Y_1, Z_1; X_2, Y_2, Z_2)$ of the first and second terrain points $(P_1; P_2)$; and derive, based on the terrain vector $(\bar{\Xi})$, a vehicle position $(X_{O1}, Y_{O1}, Z_{O1}; X_{O2}, Y_{O2}, Z_{O2})$ at one of the first and second points in space $(O_1; O_2)$.

13. An on-board arrangement according to claim 12, wherein the processing means is adapted to receive vehicle movement data in the form of a translation vector $(\bar{R})$ which represents a movement in space between the first and second points in space $(O_1; O_2)$.

14. An on-board arrangement according to claim 12, wherein the processing means is adapted to receive vehicle movement data in the form of a rotation vector $(\bar{A})$ which represents an attitude change between the first and second points in space $(O_1; O_2)$.

15. An on-board arrangement according to claim 10, wherein the processing means is adapted to receive a respective vehicle position $(X_{O1}, Y_{O1}, Z_{O1}; X_{O2}, Y_{O2}, Z_{O2})$ for each of the first and second points in space $(O_1; O_2)$; and derive, based on the terrain vector $(\bar{\Xi})$, a position $(X_i, Y_i, Z_i)$ of a terrain point $(P_i)$ in proximity of the vehicle.

16. An air vehicle, comprising an arrangement according to claim 10.

* * * * *